(12) United States Patent
Lin et al.

(10) Patent No.: US 7,646,866 B2
(45) Date of Patent: Jan. 12, 2010

(54) SLIDE MODULE FOR A SLIDE TYPE ELECTRONIC DEVICE

(75) Inventors: Jui-pin Lin, Tu-Cheng (TW); Te-hung Yin, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 445 days.

(21) Appl. No.: 11/785,106

(22) Filed: Apr. 16, 2007

(65) Prior Publication Data
US 2008/0253555 A1 Oct. 16, 2008

(51) Int. Cl.
*H04M 1/00* (2006.01)
*H04M 9/00* (2006.01)
(52) U.S. Cl. .................. 379/433.12; 455/575.4
(58) Field of Classification Search ............ 379/433.01, 379/433.11, 433.12, 433.13; 455/90.3; 361/679.05
See application file for complete search history.

(56) References Cited
U.S. PATENT DOCUMENTS
2005/0107137 A1 * 5/2005 Byun et al. .............. 455/575.1
* cited by examiner

*Primary Examiner*—Tuan D Nguyen
(74) *Attorney, Agent, or Firm*—Rosenberg, Klein & Lee

(57) ABSTRACT

A slide module for a slide type electronic device includes a slide base having two opposite slide edges curling inside to form two longitudinal roll edges. A pair of slide rails are provided with a pair of slick guide recesses. The guide recess receives one roll edge sliding along the guide recess. A locating recess is defined above the guide recess. A guide hole is defined in the slide rail passing therethrough. A slide tray defines a pair of fixed blades located in the locating recesses respectively at two sides thereof. A torsion spring has two free ends. The first end is connected to the slide base and the second end is connected to the slide tray. A pair of guide rods are inserted in the guide holes respectively and equipped in both sides of the slide base. The guide rod slides along the guide hole.

3 Claims, 4 Drawing Sheets

SLIDE MODULE FOR A SLIDE TYPE ELECTRONIC DEVICE

BACKGROUND OF THE INVENTION

1. Field of the Invention

The present invention relates to a slide module, and more particularly to a slide module installed in a slide type electronic device to enable an upper housing to slide on a lower housing.

2. The Related Art

Recently, a lot of portable electronic devices such as portable phones have become popular in our society. Various types of portable electronic devices such as, a bar type, a flip type, a folder type, etc. are manufactured to satisfy different people.

A bar type electronic device, since its keypad is exposed, can easily be damaged or the keypad can be pressed by mistake. A flip type electronic device is introduced to solve the problem by a provided flip to protect the keypad. However, it still remains the same problem, which the bar type electronic device has, that the housing size of the electronic device itself is too long to carry conveniently. Further, the flip type electronic device fails to satisfy the demand for a larger display screen in order to review the data from Internet access.

Thus, a folder type electronic device has been introduced to shorten the length of the main body. However, the hinges that connect an upper folder and a lower folder can easily be damaged because these folders have to be opened and closed repeatedly.

Therefore, a slide type electronic device has been proposed for solving the above problem.

A conventional slide type electronic device includes a slide module. The slide module disclosed in U.S. Pat. No. 6,973,186 issued Dec. 6, 2005 includes a slide member, a support plate which is fixed to an upper housing of the electronic device for supporting the slide member, and a guide plate which supports the slide member together with the support plate. The guide plate has a guide hole formed therein to guide the slide member to slide. Furthermore, the slide member includes two sleeves for combining itself with a lower housing of the electronic device and enabling the upper housing to slide over the lower housing.

However, the conventional slide module as described above is not exquisite enough. In another word, the sliding operation between the slide member and the support plate is not smooth enough. That may shorten the using life of the slide module.

SUMMARY OF THE INVENTION

An object of the present invention is to provide a slide module for a slide type electronic device. The slide module includes a slide base which is fixed to an upper housing of the electronic device. The slide base has two opposite slide edges and two opposite end portions. The side edge curls inside to form a longitudinal roll edge. A pair of slide rails is provided with a pair of slick guide recesses extending in its longitudinal direction to communicate with the outside at the two ends. The guide recess receives the roll edge of the slide base and the roll edge slides along the slick guide recess. A locating recess is defined above the guide recess passing through the two ends of the slide rail. A guide hole is defined in the slide rail passing through the whole body longitudinally. A slide tray defines a pair of fixed blades that are located respectively in the locating recesses of the slide rail from two sides thereof. A torsion spring has two free ends. The first end is connected to the slide base and the second end is connected to the slide tray. A pair of guide rods are inserted in the guide holes of the slide rail respectively and equipped in both sides of the slide base. The guide rod slides along the guide hole of the slide rail, and the two ends of the guide rod are located between the ends of the slide base.

As described above, because of the slick guide recesses of the slide rails and the corresponding roll edges of the slide base, the friction of the motion between the roll edges and the guide recesses is reduced. Then the slide base slides along the slide rails smoothly.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
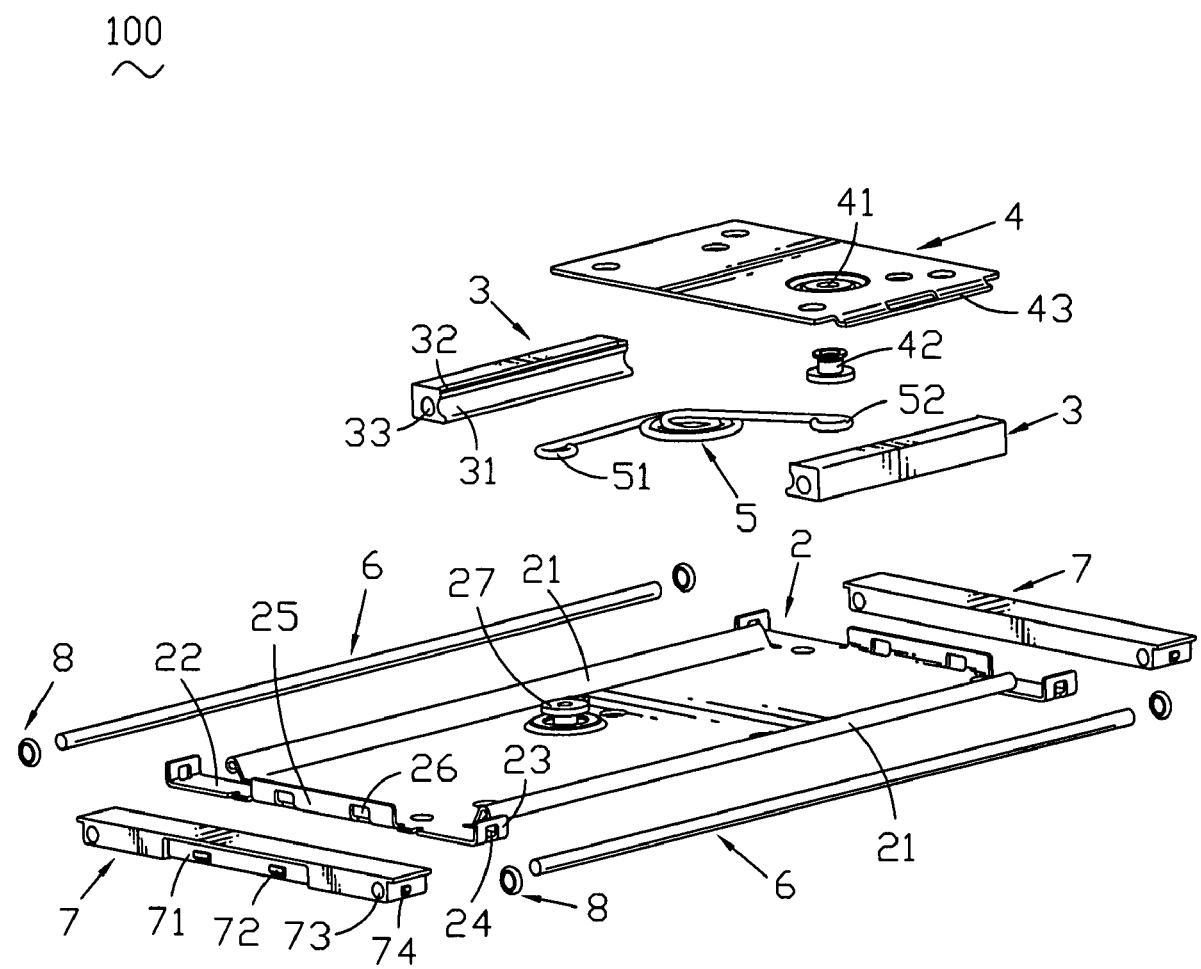
FIG. 1 is an exploded view of a slide module for a slide type electronic device of the present invention.

With reference to FIG. 1, a slide module 100 for a slide type electronic device mainly includes a slide base 2 fixed to an upper housing of a slide type electronic device (not shown), a pair of slide rails 3 along which the slide base 2 slides, a slide tray 4 located between the slide rails 3 and fixed to a lower housing, and a torsion spring 5.

Please refer to FIG. 1 again, the slide base 2 is a rectangular-shaped plate and has two parallel side edges and two opposite ends. Each side edge of the slide base 2 curls inside to form a longitudinal roll edge 21. The front end and the back end of the slide base 2 are the same and face to face with each other. Now take the front end for example, each side of the front end of the slide base 2 extends outward to form a supporting arm 22. The end edge of the supporting arm 22 bends upward to define a buckling portion 23. The buckling portion 23 has a buckling hole 24 defined therein. The central portion of the front end of the slide base 2 stretches forward and then bends upward to form a locking member 25. The locking member 25 defines two locating holes 26 passing through thereof. The longitudinal middle of the slide base 2 defines a fixing portion 27 near one of the side edges thereof.

The inner side of the slide rail 3 is provided with a guide recess 31 extending in its longitudinal direction to communicate with the outside at the two ends. The guide recess 31 is a slick curve. A locating recess 32 defined above the guide recess 31 passes through the two ends of the slide rail 3. A guide hole 33 is defined in the slide rail 3 and passes through the whole body longitudinally.

The slide tray 4 is board-shaped. Beside one side of the slide tray 4 an aperture 41 is defined corresponding to the fixing portion 27 of the slide base 2. A rivet 42 couples with the aperture 41. The board-shaped slide tray 4 has a pair of fixed blades 43 extending from its two sides.

The torsion spring 5 has two free ends. The first end 51 is connected to the fixing portion 27 of the slide base 2 and the second end 52 is disposed around the rivet 42 of the slide tray 4.

Figure 2:
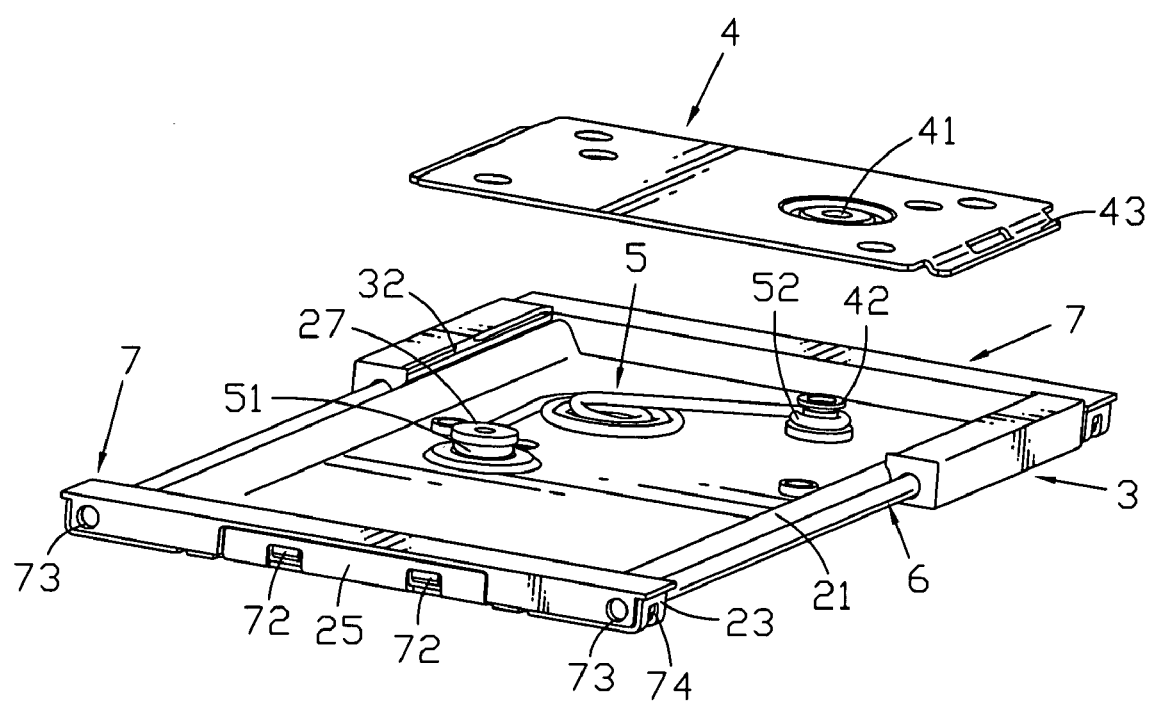
FIG. 2 is an assembled view of the slide module with a slide tray exploded therefrom.
Figure 3:
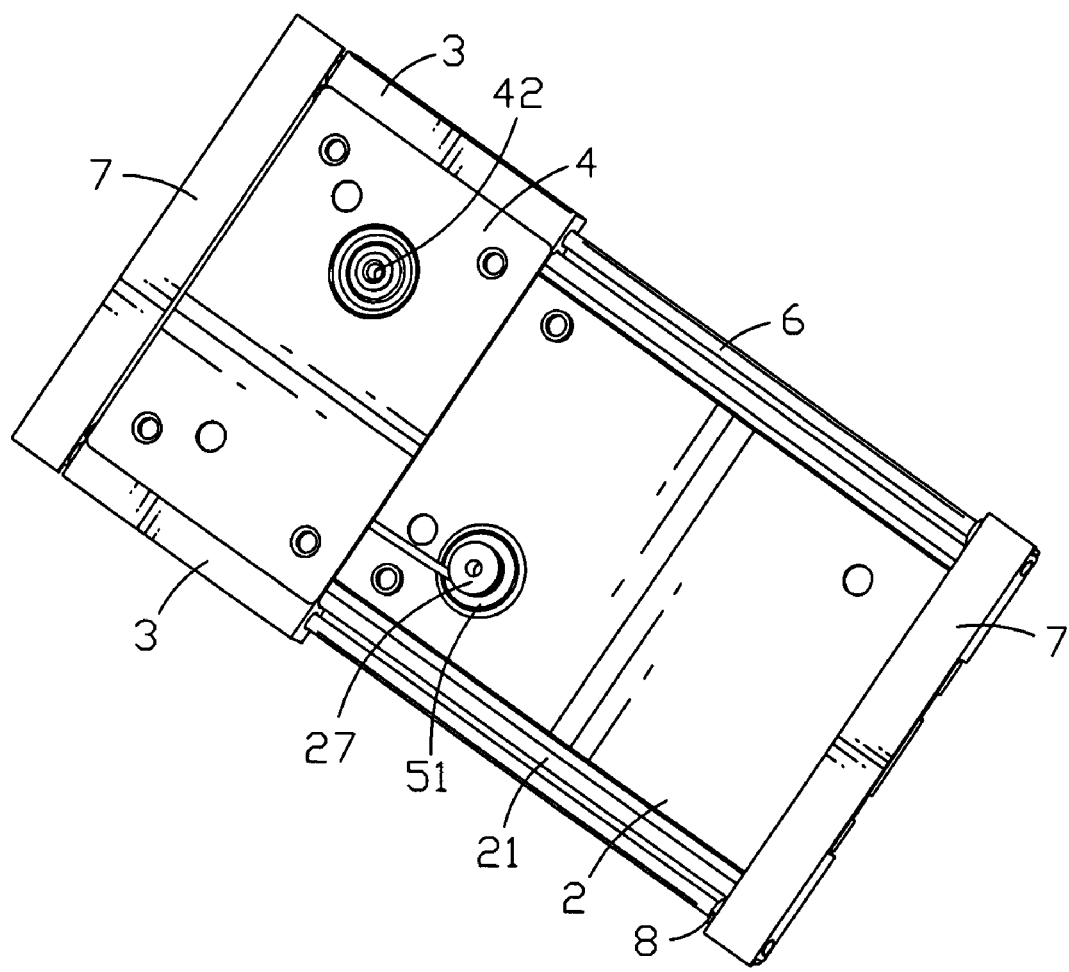
FIG. 3 is a perspective view of the slide module of the present invention.

Referring to FIGS. 2-3, in assembly, the roll edge 21 of the slide base 2 is placed in the guide recess 31 of the slide rail 3. The torsion spring 5 is arranged between the slide base 2 and the slide tray 4. The first end 51 of the torsion spring 5 is connected to the fixing portion 27 of the slide base 2 and the second end 52 is disposed around the rivet 42 that is assembled in the aperture 41 of the slide tray 4. Then, the fixed blades 43 of the slide tray 4 are interposed in the locating recesses 32 of the slide rail 3.

Refer to FIGS. 1-3 again, a pair of guide rods 6 are inserted into the guide holes 33 of the slide rail 3 respectively and equipped in both sides of the slide base 2. Both ends of the guide rod 6 extend out from the two ends of the guide hole 33 and are supported via a pair of lateral bar-shaped supporting members 7 that are placed on the supporting arms 22 of the slide base 2. The front surface of the supporting member 7 defines a lateral notch 71 towards the inner of the supporting member 7. The inner surface of the notch 71 protrudes outward to form two locating projections 72 at the two sides. Two cavities 73 are arranged near two side edges of the supporting member 7 respectively and pass through the supporting member 7 longitudinally. Each side surface of the supporting member 7 protrudes outward to define a buckling projection 74.

The supporting member 7 is assembled on the supporting arm 22 of the slide base 2. The notch 71 couples with the locking member 25 with the locating projections 72 and the buckling projections 74 locked in the locating holes 26 and the buckling holes 24 correspondingly. The two ends of the guide rod 6 are inserted into the corresponding cavities 73 of the supporting member 7. A buffer spacer 8 is put around the guide rod 6 at the two ends for reducing noise or impact created upon collision between the slide rail 3 and the supporting member 7.

Figure 4:
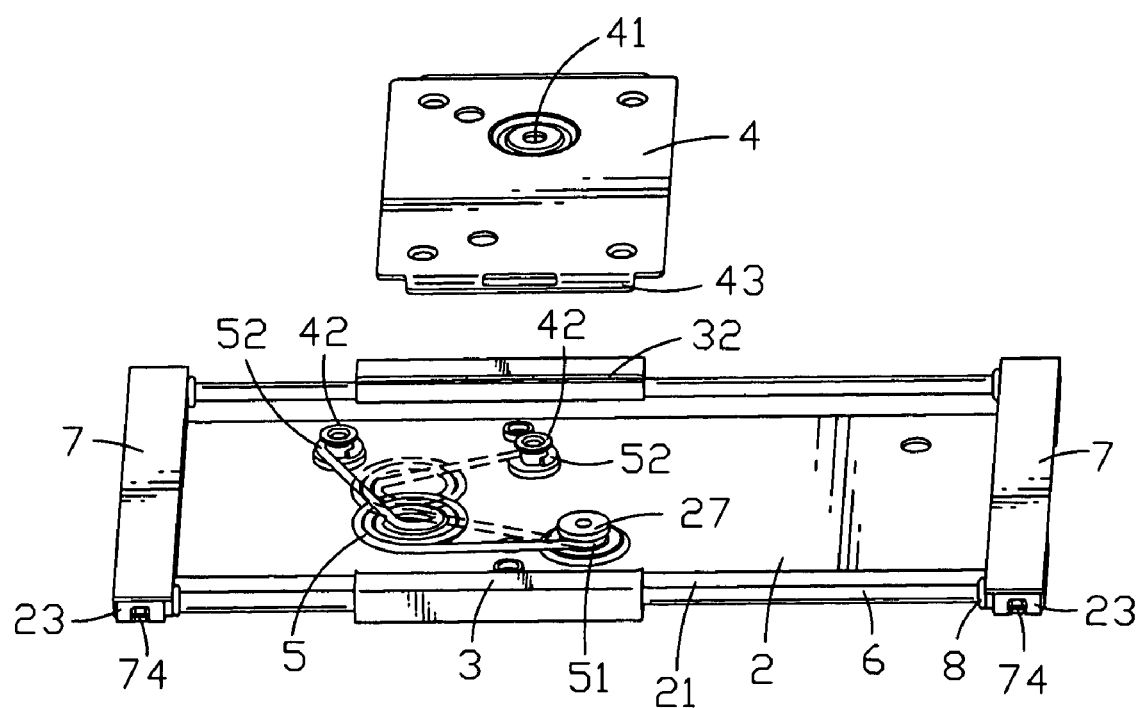
FIG. 4 is a perspective view illustrating the slide operation of the slide module.

Refer to FIG. 4, as a user slides the upper housing on the lower housing to open the slide type electronic device, a certain level of external force is applied from the user to the upper housing and brings the slide base 2 to slide forward along the slide rails 3. The roll edge 21 of the slide base 2 slides forward along the slick guide recess 31 and the guide rod 6 moves forward along the guide hole 33. The rivet 42 slides following the slide base 2 and leads the second end 52 of the torsion spring 5 to approach to the first end 51 that is located on the slide base 2 gradually. So the elastic force in the torsion spring 5 increases gradually. When the distance between the first end 51 and the second end 52 of the torsion spring 5 is shortest, the stored elastic force of the torsion spring 5 is maximized. At this time, although the user does not slide the upper housing on the lower housing, the second end 52 of the torsion spring 5 continues to move and passes the closest position to the first end 51 of the torsion spring 5, and the second end 52 becomes further spaced apart from the first end 51. Then the elastic force of the torsion spring 5 makes the upper housing completely open from the lower housing. So, the upper housing slides on the lower housing by the release of the elastic force of the torsion spring 5.

As described above, because of the smooth guide recess 31 and the roll edge 21, the slide base 2 slides along the slide rail 3 smoothly. The friction of the motion between the roll edge 21 and the guide recess 31 is reduced. Meantime, the supporting member 7 buckles on the end of the slide base 2 directly, so the structure of the slide module 100 is simplified.

An embodiment of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A slide module for a slide type electronic or communication device comprising:
    a slide base, which is fixed to an upper housing of the electronic or communication device, having two opposite side edges and two opposite end portions, the side edge curling inside to form a longitudinal roll edge;
    a pair of slide rails, provided with a pair of slick guide recesses extending in its longitudinal direction to communicate with the outside at the two ends, a locating recess defined above the guide recess passing through the two ends of the slide rail, a guide hole defined in the slide rail and passing through a whole body of the slide rail longitudinally;
    a slide tray, a pair of fixed blades extending from the two sides of the slide tray;
    a torsion spring, having two free ends, the first end connected to the slide base and the second end connected to the slide tray; and
    a pair of guide rods inserted in the guide holes of the slide rail respectively and equipped in both sides of the slide base;
    wherein the fixed blade of the slide tray is fixed in the locating recess of the slide rail, the guide rod is inserted into the guide hole of the slide rail and slides along the guide hole, and the two ends of the guide rod is located between the two ends of the slide base, the roll edge of the slide base is placed in the guide recess and slides along the guide recess.

2. The slide module for a slide type electronic or communication device as claimed in claim 1, wherein the two end of the slide base extends outward to from a pair of supporting arms, the end edge of the supporting arm bending upward to define a buckling portion, the buckling portion having a buckling hole defined therein, and wherein the central of the end portion of the slide base stretches forward and then bends upward to form a locking member, the locking member defining two locating holes passing through thereof.

3. The slide module for a slide type electronic or communication device as claimed in claim 2, wherein the two ends of the guide rod extend out from the two ends of the guide hole and are located via a pair of supporting members placed on the supporting arms of the slide base, the outer surface of the supporting member defining a lateral notch towards the inner of the supporting member, the inner surface of the notch protruding outward to form two locating projections, two cavities being arranged near two side edges of the supporting member respectively and passing through the supporting member longitudinally, each side surface of the supporting member protruding outward to define a buckling projection.

* * * * *